United States Patent [19]
Guede et al.

[11] Patent Number: 5,293,235
[45] Date of Patent: Mar. 8, 1994

[54] METHOD AND DEVICE FOR BORDERING, IN DIGITAL OPTICAL IMAGE FORMATION, A SUBJECT INCRUSTED ON A BACKGROUND

[75] Inventors: Catherine Guede, Maison Lafitte; Jean-Luc Grimaldi, Ermont, both of France

[73] Assignee: Thomson-Broadcast, Cergy St Christophe, France

[21] Appl. No.: 846,928

[22] Filed: Mar. 6, 1992

[30] Foreign Application Priority Data

Mar. 8, 1991 [FR] France .................... 91 02823

[51] Int. Cl.⁵ .......................................... H04N 5/265
[52] U.S. Cl. .................................... 348/586; 345/144
[58] Field of Search ............... 358/183, 160, 22, 182; 340/730; H04N 5/265

[56] References Cited

U.S. PATENT DOCUMENTS

| | | | |
|---|---|---|---|
| 4,573,172 | 2/1986 | Grimaldi | 375/116 |
| 4,646,154 | 2/1987 | Shinohara et al. | |
| 4,794,627 | 12/1988 | Grimaldi | 375/114 |
| 4,809,070 | 2/1989 | Lake, Jr. | 358/166 |
| 4,868,663 | 9/1989 | Grimaldi et al. | 358/209 |
| 4,908,700 | 3/1990 | Ishii et al. | 358/183 X |
| 4,922,345 | 5/1990 | Barton et al. | 358/183 |
| 4,961,114 | 10/1990 | White | 358/183 |

OTHER PUBLICATIONS

Patent Abstracts of Japan, vol. 9, No. 327(P-415)[2050], Dec. 21, 1985, & JP-A-60-151 787, Aug. 9, 1985, T. Nagato "Generator of Diagram".
Patent Abstracts of Japan, vol. 9, No. 214(P-384)[1937], Aug. 31, 1985, & JP-A-60 073 788, Apr. 25, 1985, K. Ochiai, "Vector Signal Occurrence Method".
IEEE Transaction on Computers, vol. 24, No. 10, Oct. 1975, pp. 983-988, A. K. Agrawala, "On Generating a Line Parallel to a Digital Line-A Sequential Approach".

*Primary Examiner*—Victor R. Kostak
*Attorney, Agent, or Firm*—Oblon, Spivak, McClelland, Maier & Neustadt

[57] ABSTRACT

For every point of an image in a special effects digital optical image formation method and apparatus the value of a border key signal is obtained by conducting a search for the maximum value of the subject's key signal in an analysis window centered on this point. The subject's key signals of the points in the window are delayed so as to make them simultaneous and are supplied to the same comparator which may be controlled in order to inhibit some of its inputs so as to define, for example, a circular analysis window; such a process makes it possible to obtain a regular border.

5 Claims, 3 Drawing Sheets

METHOD AND DEVICE FOR BORDERING, IN DIGITAL OPTICAL IMAGE FORMATION, A SUBJECT INCRUSTED ON A BACKGROUND

BACKGROUND OF THE INVENTION

The present invention is related to the digital formation of images and it concerns a method and device which make it possible to create a border around a subject incrusted on a background, in particular in digital video; the invention also concerns a special effects generator including such a device.

The video signal V, output from a mixing circuit and corresponding to the incrustation of a subject on a background, has the form $$V = aS + (1-a)F \quad \text{with } 0 < a < 1$$

where S and F are the video signals of the subject and background respectively before incrustation, and a is a signal referred to as the key signal of the subject.

A coloured border may be added around the subject in order to make it more visible on the background. To obtain this border, it is possible first to create an incrustation on the background, according to a key signal of a border b, which corresponds to the key signal of the subject expanded in every direction; this first incrustation is produced by a video signal $$b.B + (1-b)F \quad \text{with } 0 < b < 1$$

where B is the video signal of the colour of the border; the subject is then incrusted on the result, according to the subject's key signal, a; this second incrustation is therefore given by the video signal $$V_b = a.S + (1-a)[b.B + (1-b)F]$$

Alternatively, the subject may first be incrusted on the background, by the video signal $$V = a.S + (1-a)F$$

then the border only is incrusted on the result, according to the border key, c; this incrustation is produced by the video signal $$V'_b = c.B + (1-c)[a.S + (1-a)F],$$

and it should be noted that $V'_b$ corresponds to $V_b$ except for the edge effects, and that c is equal to b−a.

This outline incrustation effect also makes it possible to incrust the outline on the background, without the subject.

A known bordering method involves determining the border key signal, b, by comparing, for every point i,j of the screen, the subject's key signal corresponding to that point and the subject's key signals corresponding to the points offset by 1 to n lines in the same column j, then by comparing with one another the key signals of the corresponding points offset by 1 to m points. In order to obtain a border around the outside of the subject, touching its edges, it is therefore sufficient to conserve only the maximum value obtained from the n+1 comparisons made, then to compare these maximum values to one another and again conserve only the maximum value; this latter maximum value therefore constitutes the border key signal allocated to the points on the screen having the coordinates $i-n/2, j-m/2$, where m and n are even numbers.

This known method can be summarized as follows: to obtain a border of n/2 lines and m/2 points around a subject, a search is performed in a rectangular window of $(m+1) \times (n+1)$ points of the key signal of the subject for the maximum value. This value then constitutes the key signal for the point situated in the center of the window.

This known method presents some disadvantages:
when the subject has corners with acute angles, the corresponding angles of the border are horizontally and/or vertically truncated,
the border is not isotropic because the purely vertical or horizontal edges are less extended than the others. For this reason, when the window is square, an edge at an angle of 45 degrees is the square root of two, that is, approximately 1.4 times more extended than a vertical or horizontal edge; therefore a border around a circular subject tends to be squarish and, the bigger the border in relation to the subject, the more this squareness becomes apparent.

SUMMARY OF THE INVENTION

The purpose of the present invention is to avoid, or at least to reduce these disadvantages.

This is achieved by finding the maximum value, not in two consecutive stages, but by simultaneously comparing with one another all the values of the subject's key signals corresponding to the points of the window being analyzed, which makes it possible to choose the form of this window so as to guarantee good isotropy and, in particular, so as to have a circular form when the horizontal and vertical distribution of the points of the image is identical.

According to the invention there is provided a method for bordering, in digital optical image formation, a subject incrusted on a background, when the subject's key signals are input in digital form, consisting in making an analysis by comparing the values of the subject's key signal for points located in a search window having a central point, so as to determine a maximum value and to constitute, with this maximum value, the value of a border key signal relating to the central point of the search window, and consisting in delaying the subject's key signals for the different points of the search window so as to make them simultaneous, and then to carry out the comparison of values.

According to the invention there is also provided a device for bordering, in digital optical image formation, a subject incrusted on a background, when the subject's key signals are input in digital form, including delaying means related to comparison means for conducting a comparative analysis of the values of the subject's key signal for points located in a search window, the comparison means including a comparator having at least as many signal inputs as there are points in the search window, the delaying means delaying the subject's key signals for the different points of the search window so as to make them simultaneous, and in which each of these simultaneous signals is allocated to a distinct input among the signal inputs of the comparator.

BRIEF DESCRIPTION OF THE DRAWINGS

The present invention will be better understood and other characteristics will become apparent with the help of the following description and corresponding figures which represent.

In the figures the corresponding elements have the same references.

In the figures the precise synchronizing devices, using current technology, have not been represented in order to make the drawings clearer and simplify the descriptions.

MORE DETAILED DESCRIPTION

Figure 1:
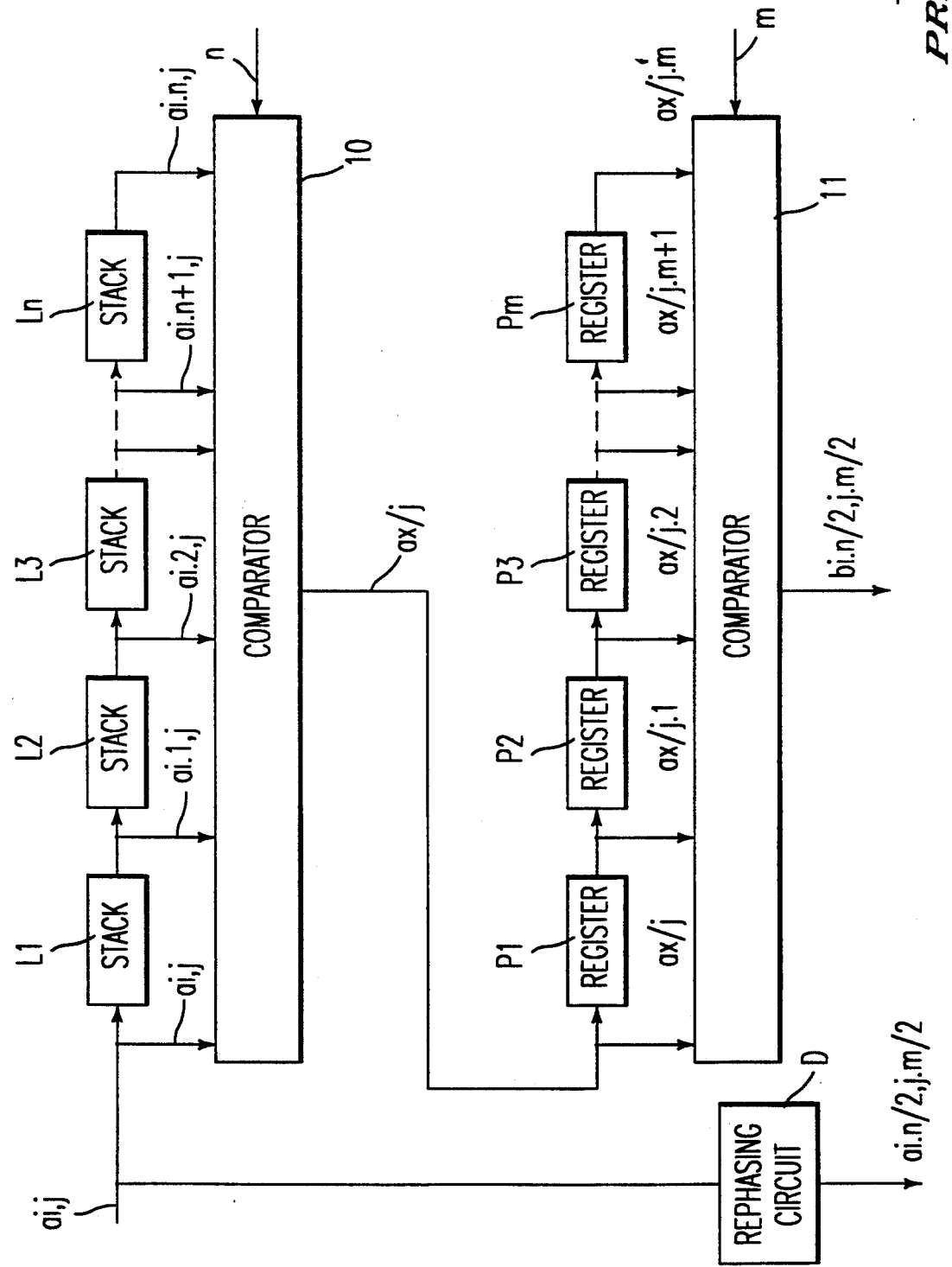
FIG. 1, a known device for bordering a subject incrusted on a background.

FIG. 1 shows a device for bordering a subject incrusted on a background. This known device makes it possible to implement the known method, described earlier, for bordering a subject incrusted on a background.

The device according to FIG. 1 includes a signal input to which the subject's key signals, corresponding to a subject incrusted on a background, are applied successively and in digital form. At a given time, the input signal is $a_{i,j}$, that is the subject key signal at point i,j of the screen located at the intersection of line i with column j.

Figure 2:
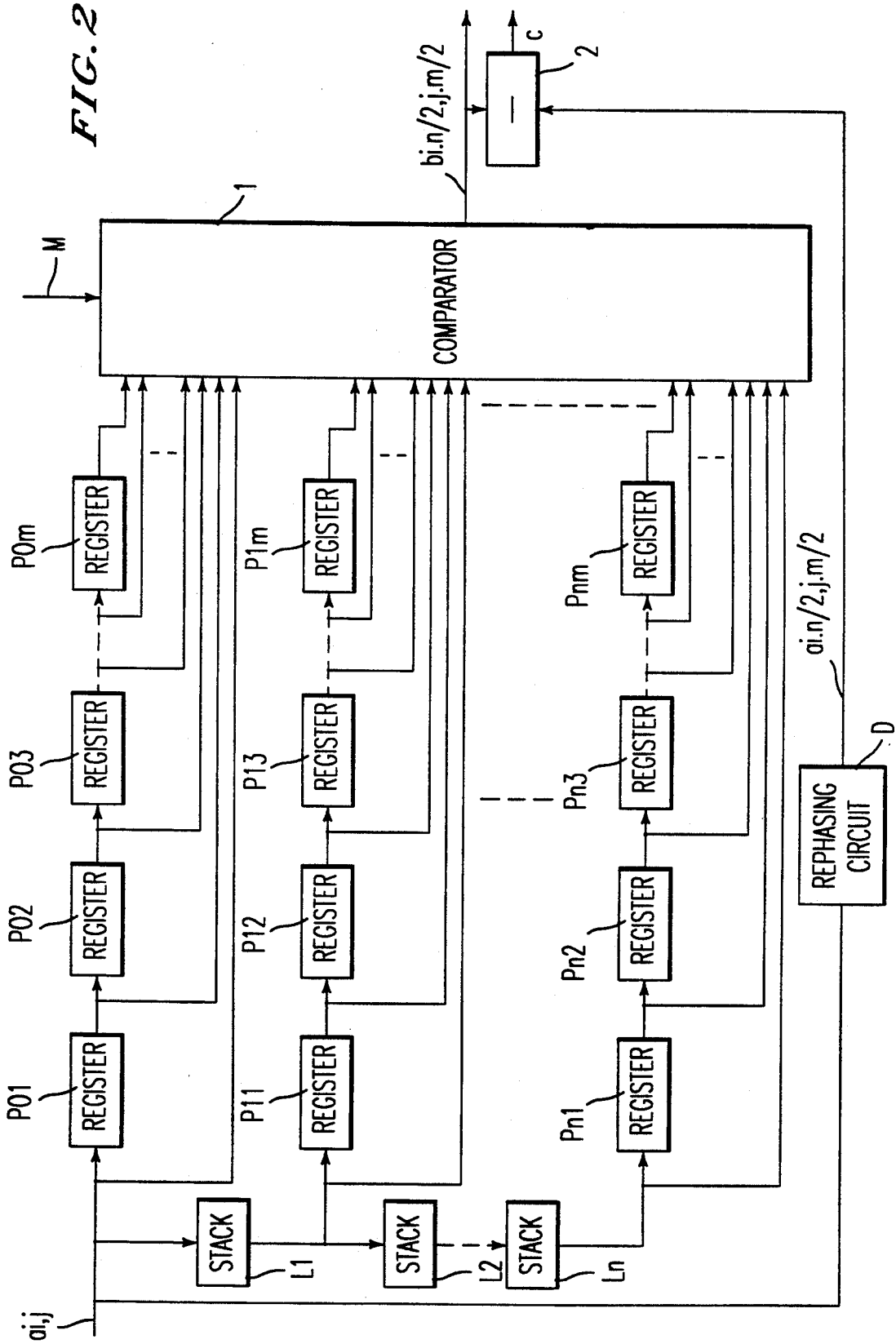
FIG. 2, a device according to the invention, for bordering a subject incrusted on a background.

It must be noted that, in FIG. 1, and likewise in FIG. 2, because the signals to be transmitted are signals with several bits in parallel, the connections are multifilament links even though they are represented in the figures by simple lines for simplicity.

The signal input is linked to the input of the first delay circuit L1 of a group of n delay circuits L1 to Ln in series. These delay circuits each comprise a FIFO (First In First Out) stack of registers and each determines a delay equal to the time taken for scanning a line on the screen so that, when circuit L1 receives signal $a_{i,j}$, circuit L3, for example, receives signal $a_{i-2,j}$ and circuit Ln outputs signal $a_{i-n,j}$.

A comparator 10 receives the n+1 signals delivered, at the same time, by the signal input and by the outputs of the n delay circuits L1 to Ln; this comparator, which generally includes more than the n+1 signal inputs used, also includes a control input in order to inhibit its unused inputs. This comparator compares the signals $$a_{i,j}\ a_{i-1,j}\ a_{i-2,j} \cdots a_{i-n,j}$$

with one another, and outputs the one with the highest value; this maximum signal is written $a_{x/j}$. The output of comparator 10 is connected to the input of the first delay circuit P1 of a group of m delay circuits P1 to Pm in series. These delay circuits each comprise a register and each determine a delay equal to the time taken between two consecutive points of a line, when the line is scanned. Therefore, when circuit P1 receives the signal $a_{x/j}$ relating to column j, circuit P3, for example, outputs the corresponding signal $a_{x/j-3}$ relating to column j−3 and circuit Pm outputs the signal $a_{x/j-m}$.

A comparator 11, similar to comparator 10, receives the m+1 signals supplied, at the same time, from the output of comparator 10 and from the outputs of the m delay circuits P1 to Pm; in this comparator, also, a control input makes it possible to inhibit the unused signal inputs. Comparator 11 compares the signals $$a_{x/j}\ a_{x/j-1}\ a_{x/j-2} \cdots a_{x/j-m}$$

with one another, and selects the one with the highest value. This maximum signal is written $b_{i-n/2,j-m/2}$, where m and n are even numbers.

Signal $b_{i-n/2,j-m/2}$ constitutes the border key signal required for point i−n/2,j−m/2 of the image.

A rephasing circuit, D, includes, in series, n/2 register stacks identical to stacks L1 to Ln, and m/2 registers identical to registers P1 to Pm. This rephasing circuit is designed to supply a subject key signal, a, corresponding to the same point of the image as the border key signal, b, output by comparator 11; it must be noted that in fact the rephasing circuit D has in addition, in series with its n stacks and m registers, a delay circuit made up of registers and designed to produce a delay equal to the sum of the delays caused by the processes of comparators 10 and 11; but, in FIG. 1, as will also be the case in FIG. 2, it is supposed that the comparators do not introduce any delay, given the signals indicated in their inputs and outputs.

Figure 3:
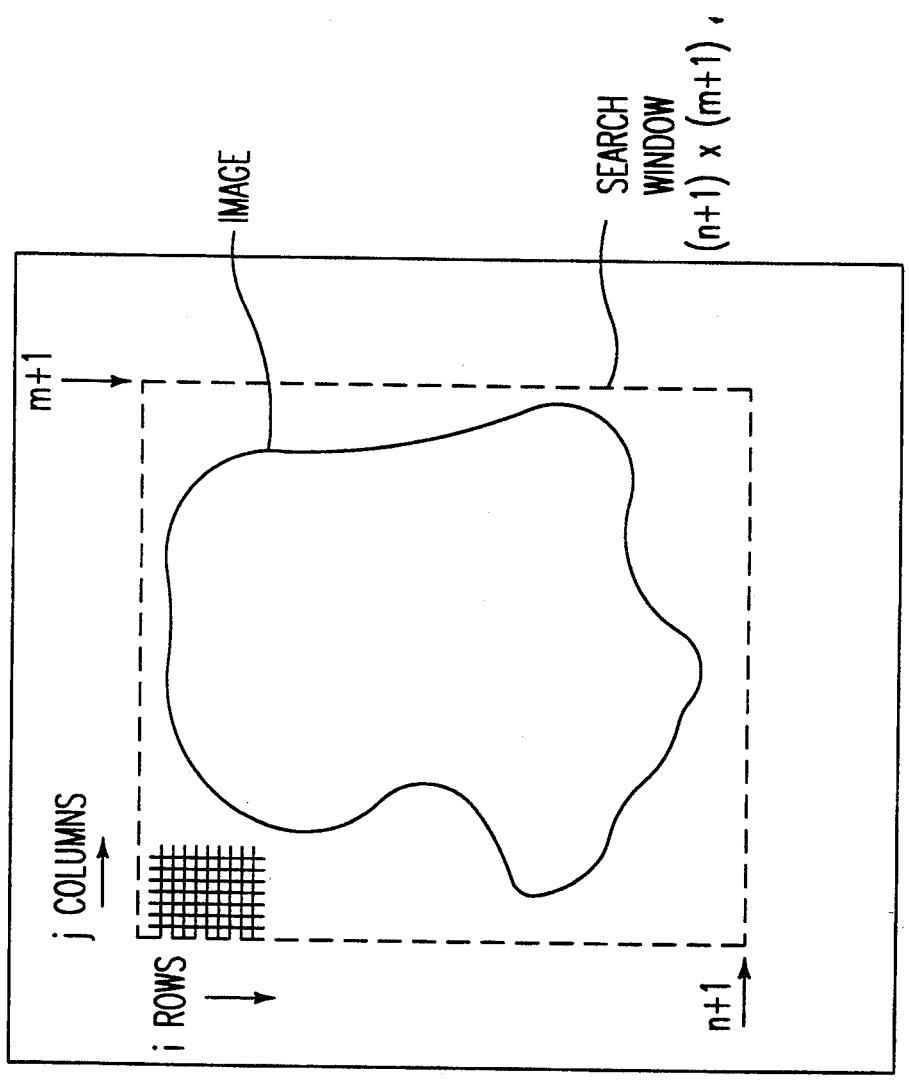
FIG. 3 illustrates the search window of $(n+1) \times (m+1)$ dimensions for use in creating the border which surrounds an image on the screen.

The device according to FIG. 1 defines, as indicated earlier, a rectangular analysis window with $(m+1) \times (n+1)$ points in the image, broken down vertically then horizontally so as to make it possible to determine a border key signal taking into account the subject key signals of all the points of the window, as illustrated in FIG. 3 the disadvantages of such a process were also mentioned earlier.

FIG. 2 shows a device according to the invention for bordering a subject incrusted on a background. This device includes a signal input to which the subject key signals are applied successively, and in digital form. At a given time, the signal input receives signal $a_{i,j}$ that is the subject's key signal at point i,j of the image located at the intersection of line i with column j.

As in FIG. 1, the signal input is connected to the input of a first delay circuit L1 of a group of n delay circuits L1 to Ln in series, each comprising a FIFO register stack which determines a delay equal to the time taken to scan a line on the image.

The signal input of the device is also connected to an input of a comparator 1 and to the input of a first register P01 of a group of registers, P01 to P0m, mounted in series, each output of which is linked to an input of comparator 1, with a one-to-one relationship between the outputs and the inputs. Each of these m registers determines a delay equal to the time taken between two consecutive points of a line, when the line is scanned.

Similarly, the output of each of these stacks L1 to Ln is linked to an input of comparator 1 and to the input of the first register, such as P11, of a group of m registers, such as P11 to P1m, mounted in series and of which each output is linked to an input of comparator 1, with a one-to-one relationship between the outputs and the inputs.

Therefore, at a given moment, comparator 1 receives, at $(m+1) \times (n+1)$ of its inputs respectively, the subject key signals

| $a_{i,j}$ | $a_{i,j}-1$ | $a_{i,j}-2$ | ... | $a_{i,j}-m$ |
|---|---|---|---|---|
| $a_{i-1,j}$ | $a_{i-1,j}-1$ | $a_{i-1,j}-2$ | ... | $a_{i-1,j}-m$ |
| $a_{i-2,j}$ | $a_{i-2,j}-1$ | $a_{i-2,j}-2$ | ... | $a_{i-2,j}-m$ |
| $a_{i-n,j}$ | $a_{i-n,j}-1$ | $a_{i-n,j}-2$ | ... | $a_{i-n,j}-m$ |

In other words, the comparator receives all the signals included in a rectangular search window relating to $(m+1) \times (n+1)$ points of the image. By analyzing these signals so as to identify the signal with the maximum value, the comparator produces exactly the same result, if the signals on the signal input of the devices are identical, as comparator 11 in FIG. 1; the device according to the invention, as shown in FIG. 2, would not hold much interest in relation to the device shown in FIG. 1 if the analysis were carried out in this way. However, comparator 1 in fact includes a control input, M, inhibiting all or some of its signal inputs, which makes it possible to ignore some of the signals received at a given time. By suitable choice of the inhibited inputs, it is then possible to retain in the search window only those points of a disk which fits entirely in the rectangular window. This then amounts to delimiting, in the rectangular search window, a circular analysis window.

It must be noted that any other form of window may be used, in particular elliptical windows, or even windows which are rectangular and smaller than the search window defined by the whole of the signals received by comparator 1. Whatever the form of the analysis window, it is generally useful to center it on the same point $i-n/2, j-m/2$ as the rectangular search window, relating to the $(m+1)\times(n+1)$ points. Comparator 1 therefore supplies a border key signal which is written $b'_{i-n/2, j-m/2}$ to distinguish it from the border key signal obtained with the device according to FIG. 1.

The device according to FIG. 2 also includes a rephasing circuit, D, identical to that in FIG. 1, so as to supply, on its output, a subject key signal $a_{i-n/2, j-m/2}$ corresponding to the same point of the screen as the border key signal, delivered at the same instant by comparator 1.

A subtractor circuit, 2, makes it possible to obtain the outline key signal, c, relating to the point $i-n/2, j-m/2$, by subtraction between the signal of the rephasing circuit D and the signal of comparator 1.

The device according to FIG. 2 may be simplified in the case of an analysis window having fixed form and dimensions; in this case, the conductors, connected to the inputs of comparator 1 whose signals would be inhibited may be eliminated; the search window and the analysis window are then identical.

It was mentioned in the description of FIG. 2 that the comparator 1 carried out a search for the maximum value; such a search is liable to dilate a key signal and makes it possible to obtain a border touching the edge of the subject but on the outside of the subject. In the event of the border being required on the inside of the subject, it is the minimum value which must be found and, to incrust the subject, it is the former key signal of the subject which becomes the key signal of the border and it is the signal calculated by finding the minimum value which becomes the key signal of the subject. Because of this search for the minimum value, the signal obtained is narrower than the subject key signal on the basis of which it is determined.

It must be noted that the invention can also be used to determine a shadow producing an effect of relief for a subject incrusted on a background; this shadow is referred to as a drop-shadow. This shadow is a partial border touching the subject and making it possible to give it an effect of relief as if by edge lighting. According to known methods and according to the invention, to calculate the key signal of a cast shadow it is sufficient to delay the subject's key signal by a certain number of lines and points. If this delay is by k lines plus q points, the cast shadow is on the right and at the bottom; on the other hand, for k lines minus q points it is on the left and at the bottom; to obtain a drop-shadow of a certain thickness, several consecutive cast shadows, usually delayed by one line and by approximately one or two points from one line to the next, are required and the signals corresponding to these lines are the input signals of a maximum value search device. The device for bordering a subject, such as described with the help of FIG. 2, can therefore be perfectly adapted to the production of a drop-shadow. To achieve this, the length of the delays of the lines must be programmable. This is achieved by carrying out a masking in the window of $(m+1)\times(n+1)$ points, which eliminates all values of the key signal except those corresponding to the offset points, for example, one line plus one point, two lines plus two points, three lines plus three points and so on up to h lines and h points; the maximum value, which is the value of the border key signal to be allocated to the different points of these cast shadows, is obtained by comparator If, moreover, a delay of h lines and h points is applied to the subject key signal, by means of the rephasing circuit D, the drop-shadow will be located higher up than the subject, whereas if the delay is zero the drop-shadow will be located lower down than the subject.

Generally, to regulate the phase of the subject in relation to its border, it is necessary to substantially delay the subject key signal and therefore the video of the subject must be delayed in the same way.

It must be noted that the image signals can originate from any source. If the original signals are not digital, they must be digitalized. In this way, using for example an image on paper, film, magnetic tape, etc., it is possible to provide the signals corresponding to this processed image in order to include a border.

The field of application of the present invention is the production of special effects, in particular for television.

What is claimed is:

1. A method for bordering, in digital optical image formation, a subject incrusted on a background, when the subject's key signals are input in digital form to a comparator means, comprising: a) making an analysis by comparing the values of the subject's key signal for points located in a search window having a central point, so as to determine a maximum value and to constitute, with this maximum value, the value of a border key signal relating to the central point of the search window, and b) delaying the subject's key signals for the different points of the search window so that the key signals of the subject are simultaneously input to said comparator wherein said maximum value is determined so that a border can be created around the subject incrusted on said background.

2. A method according to claim 1, consisting in making the analysis using the values corresponding to all the points of the search window.

3. A method according to claim 1, wherein the search window has a rectangular form and consisting in making the analysis using the values corresponding to all the points located in a window with smaller dimensions than the search window and entirely contained in the search window.

4. A device for bordering, in digital optical image formation, a subject incrusted on a background, when the subject's key signals are input in digital form, including delaying means related to comparison means for conducting a comparative analysis of the values of the subject's key signal for points located in the search window, the comparison means including a comparator having at least as many signal inputs as there are points in the search window, the delaying means delaying the subject's key signals for the different points of the search window so that the key signals of the subject are simultaneously input to said comparator, and in which each of these simultaneously input signals is allocated to a distinct input among the signal inputs of the comparator and whereby a border is created around the subject incrusted on said background.

5. A device according to claim 4, wherein the comparator includes a control input to make it possible to inhibit selected signal inputs and in this way to allow the analysis to include a set of points located in an analysis window having smaller dimensions than the search window and entirely contained in the search window.

* * * * *